Patented June 6, 1950

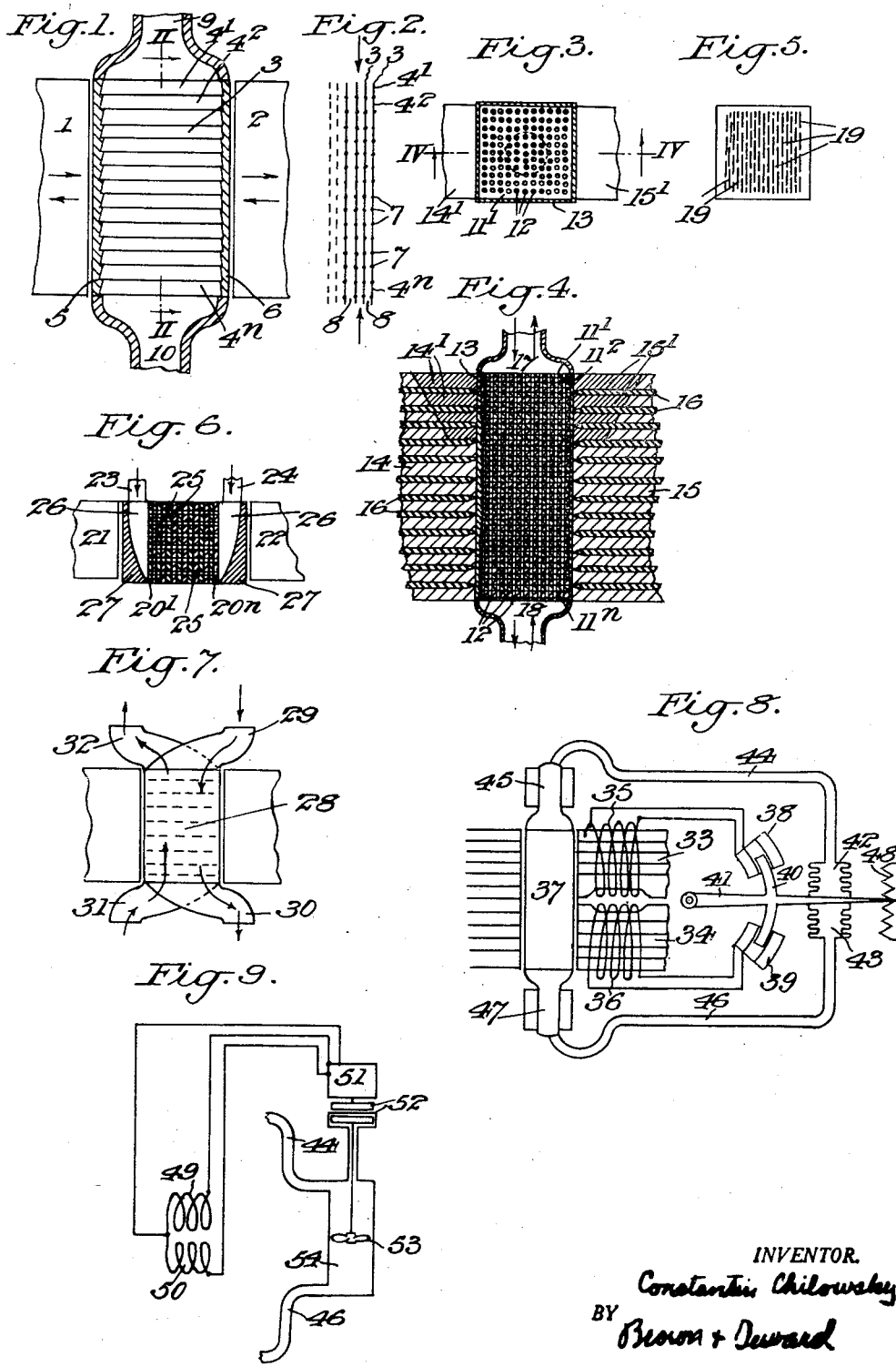

2,510,801

UNITED STATES PATENT OFFICE 2,510,801

METHOD AND APPARATUS FOR PRODUCING ELECTRICAL AND MECHANICAL ENERGY FROM THERMAL ENERGY

Constantin Chilowsky, New York, N. Y.

Application December 19, 1945, Serial No. 635,988

35 Claims. (Cl. 171—125)

This invention relates to a method and apparatus for producing electrical and mechanical energy from thermal energy.

In applicant's copending patent application Serial No. 627,832, filed November 10, 1945, now Patent No. 2,510,800, a method and apparatus were disclosed for producing rapid alternating heating of a system of laminations made of metal such as iron, nickel, cobalt and/or certain ferromagnetic alloys, such laminations being placed in a gap of a ferromagnetic armature under action of a magnetic flux. By such alternating heating and cooling at a desired frequency, preferably by liquid alkaline metal, the temperature of the laminated sections was varied between the Curie point of the laminations and a temperature slightly below the Curie point. This produced variations in the magnetic flux and introduced alternating electric current in the armature windings, a portion of the heat being thereby transformed into electric energy.

It was also suggested in said application that the heat remaining in the fluid after heating of the laminations having a higher Curie point, could be utilized for alternating heating of laminations having successive lower Curie points, thus increasing the efficiency of the system.

The present invention has for its object improvements in the process and apparatus as described in the foregoing application, relating to the assembly and utilization of ferromagnetic substances having Curie points of different temperatures, this improvement making it possible to include and to make use of large variations in temperature intervals, thus greatly increasing the efficiency.

Another object of this invention consists in a method and device for automatically maintaining the laminations at the exact temperature required by the process.

According to the foregoing patent application, in the gap of the armature are provided "interrupter sections" formed by homogeneous ferromagnetic laminations, namely of a ferromagnetic material having for its Curie point a definite temperature, the same for all the laminae.

It is known that the three basic ferromagnetic elements, nickel, iron and cobalt (in the pure state), have their respective Curie points of 362° C., 785° C. and 1112–1137° C., and that the temperature of their Curie points can be gradually varied by progressively incorporating in these metals other ingredients or metals or by alloys made of these metals.

The present invention takes these facts into consideration and, accordingly, the homogeneous ferromagnetic laminations are replaced by laminations which are non-homogeneous from the magnetic point of view.

Such laminations, which will be called "composite laminations," have a composition progressively varying from one end to the other of the lamination, and this variation of composition is such that the lamination possesses, from one end to the other, and in the direction of displacements of the metallic liquid, a progressive graduation of temperature of the Curie points. Such graduation is generally and preferably extended over a considerable range of temperature. In this manner the edge of the lamination adjacent the hot liquid, will have the highest temperature of Curie point, within the selected range of temperatures, and the edge adjacent the "cold" liquid will have the lowest Curie point temperature.

The "hot" liquid adjacent the one edge of the lamination is automatically maintained at a temperature generally slightly higher than the highest Curie point temperature, and the "cold" liquid adjacent the other edge of the lamination is automatically maintained at a temperature slightly lower than the lowest Curie point temperature.

Hereinafter, the term "Curie interval" will be applied to the small interval of temperature of the order of a few degrees C. (or even in certain cases less than 1° C.) along which the magnetic permeability of the lamination sharply falls to zero, or to a value near zero.

When certain materials are subjected to strong magnetic fields the "Curie interval" may increase considerably, up to even several tens of degrees C.

During functioning of the system, the liquid, hot at one side of the laminations and cold at the other side, is automatically maintained at such temperatures that there will be established in a lamination from one edge to the other, a graduated succession of intermediate temperatures in which the temperature of each element of the lamination (or of each line of the lamination parallel to its edge) will be in or near the "Curie interval." As a result of the oscillation or alternating circulation of the warm and cold liquids, the temperature of the entire lamination, while preserving its gradation from one edge to the other, will be subjected to alternating temperature variations, approximately equal to the Curie interval (or, in certain cases, to a fraction of one interval), accompanied by the resulting disappearance and reappearance of the magnetic permeability, or by a very large variation of this permeability.

The amplitude of this periodic variation of temperature and of permeability is a function of the amplitude of oscillation of the liquid. Preferably, the depth of the penetration of the cold and warm liquid into the channels along the lamination is of the order of the dimension of the lamination or of the length of its channels, but it can be varied within certain limits, according to the condition of power and output.

In the generator armature the interrupter section will consist of a number of such "composite laminations," parallel to each other and occupying the gap between the adjacent ends of the armature.

If the liquid traverses the slots in the laminations at right angles to the magnetic flux, Curie points will vary from one edge to the other in a direction of the movement of the liquid. If the liquid circulates parallel to the direction of the magnetic field, Curie points will vary in the laminations in the direction from one armature end to the other, always in the direction of the movement of the liquid.

Such composite laminations possess, in comparison to the homogeneous laminations, remarkable properties in that they make it possible to use effectively much greater temperature differences between the hot and cold sources for transforming heat energy into electric or mechanical energies, and to do it in a very simple and compact system, using the same armature, and, in the majority of cases, the same chamber of circulation of metallic liquids and the same oscillating or circulating liquid column.

The generator with composite lamination will be subjected to the same periodic variations of the magnetic flux (producing electric current) as with homogeneous laminations, but with the essential difference that the amount of heat taken from the hot source for heating the composite laminations will be reduced approximately in the same ratio as between the total range of temperature between the hot and cold sources in the first case and the small range of a single Curie interval in the latter case. The efficiency of the system will be increased in the same proportion.

The hot fluid, penetrating the opening adjacent the first band or element of the composite lamination, will surrender sufficient heat to said element for heating it to its Curie point. After that, however, the fluid will still retain enough heat for the second element which is at a lower temperature, and after heating the second element, it will retain enough heat for the third element which is at a still lower temperature, and so on. On the return movement, the fluid is partly again heated by the contact with the successive elements, recovering a large portion of the surrendered heat. The same process applies, in reverse, to the cooling fluid.

Due to the utilization of the high difference of temperature between the hot and cold sides of the composite sections, the total amount of heat expended to vary effectively the magnetic permeability thereof is considerably reduced by a systematic use of thermal energy otherwise wasted and, from the point of view of thermodynamics, a much greater efficiency is achieved than is possible where a homogeneous section having a single Curie interval is used.

Thus, for instance, it is known that Curie point of 785° C. for pure iron (electrolytic iron with .01% of carbon), can be progressively reduced, for instance, to 734° C. (i. e. by 52°), by progressively increasing its carbon content from .01% to .126%, and the laminations, composed of iron, can be therefore constructed with such interval. (The Curie temperature for iron can even be reduced to 695° C. by increasing the carbon content to .962%, but the output within these ranges will be considerably reduced.)

It is particularly provided to use laminations composed of nickel alloys, which may cover the entire interval or range between the ambient temperature and the Curie temperature for cobalt which is about 1112° C. Nickel and cobalt form alloys with each other in all proportions and the Curie point temperature for these alloys gradually varies from 362° C. for pure nickel to 1112° C. for pure cobalt, passing, according to the percentage of cobalt in the nickel, through the entire range of temperatures between 362° C. and 1112° C.

It is also possible to construct composite laminations for the interval between the ambient temperature and 362° C. (Curie point temperature for pure nickel). Thus, the Curie point temperature of nickel can be gradually lowered to the ambient temperature (or even to —45° C.) by alloying nickel with small percentages of non-magnetic metals or elements such as aluminum, chromium, manganese, silicon, and certain other materials. For instance, the Curie point temperature of nickel alloys can be lowered from 362° C. to 10° C. by progressively increasing the aluminum content up to 6%. The Curie point for nickel alloys will be progressively lowered from 362° C. to 0° C. by adding up to 7% of manganese, and 6% of silicon lowers this temperature to —45° C.

Thus by making the composite laminations of nickel-cobalt alloy on one hand, and nickel-aluminum or nickel-silicon on the other hand, it is possible to embrace temperature intervals from 0 to 1112° C. or from —45° C. to 1112° C.

As was mentioned above, the Curie interval within which permeability suddenly drops, may vary from about 1° to a few tens of degrees C., according to the alloy, the percentages of the ingredients and the strength of the magnetic field. Thus for iron, this interval increases from pure iron to iron with a percentage of carbon. For a nickel-cobalt alloy it increases with the cobalt content, i. e. with the increase of Curie point temperature, and for nickel-aluminum and nickel-silicon alloys it increases with the increase of aluminum or silicon content, i. e. with the decrease of Curie point. Generally, the Curie interval increases with variation from pure nickel toward alloys having higher and lower Curie points. The best generator operation is obtained when temperature variation of one element of the laminations approximately equals or is proportional to the Curie interval of this element. This can be accomplished by various methods. It is particularly provided to obtain this result by progressively decreasing the thickness of the composite lamination in the direction of the increasing Curie point, and by increasing in the same direction the size of the opening or passage between the laminations.

Besides variations in thickness of the composite laminations and clearances therebetween, other variations can be used affecting the temperature distribution and also the amplitude and curve of temperature variations, in order to improve the operation and, particularly, for approaching the sinusoidal form of the current.

In particular, it is possible to vary the curve of graduation of Curie point temperatures; or to arrange the surfaces with minute eddies; or to increase the contact surface with the fluid per unit of area, etc.

The composite laminations can have continuous variation of Curie temperature from one edge to the other. Several methods of making such laminations can be used; for instance, with iron it is possible to produce increasing enrichment with carbon by the process of cementation (carbonization) with a progressively variable concentration of carbon or variable duration of application of carbon material to the lamina (from one edge of the lamination to the other). With nickel alloys, it is possible by a similar process to obtain variable absorption of cobalt and other ingredients at high temperatures. It is also possible to form alloys by mixing two metallic powders in variable proportions, etc.

The composite laminations can also have discontinuous variation of Curie temperature and can in this case consist, for instance, of a succession of narrow bands, or strips, juxtaposed by their edges, each band or strip having a Curie point, for instance, higher than the preceding band or strip. The difference of Curie points in the adjacent bands should preferably not exceed the Curie intervals. The adjacent bands can be suitably soldered at the edges for forming a single lamination, when the Curie temperatures are not too high. For high temperatures where there may be danger of mutual diffusion of the ingredients along the lamination, it is preferable not to solder the edges.

It is understood, and in accordance with the above-mentioned patent application, that the term "composite laminations" will include not only the laminations proper but also any system of ferromagnetic elements, having in the direction of movement of the fluid, a progressive graduation of Curie point temperatures, and capable at the same time of passing the magnetic flux. This system will be, of course, permeable by fluids, offering a large heating surface and, on the other hand, being sufficiently permeable for the magnetic flux passing through the armature. The assembly of such a system which will occupy the armature gap, and whose successive sections perpendicularly to the direction of flow of the fluid (herein called "elements") will have progressively increasing temperatures of Curie points, will form a "composite section," different examples of which are given in the appended drawings.

The introduction of composite laminations and sections, using a large range or interval of temperatures, permits the decrease in a large proportion of the amount of heat to be carried by the oscillation or the circulation of a fluid for heating the laminations. Accordingly, the total cross-sectional area of the channels for passage of the fluid may be greatly reduced in relation to the cross-sectional area (in corresponding planes) of the laminae; and fluids with much lower thermic capacity can be used. Therefore, it is provided that, for certain temperature intervals, the metallic liquids can, if desired, be replaced by metallic vapors, particularly by superheated mercury vapors, or by vapors of alkali metals such as potassium, rubidium or sodium. There will be also a particular advantage to use as fluids rare gases and hydrogen under pressure.

Alloys of nickel with non-magnetic metals and elements make it possible to construct the composite laminations for large temperature ranges or intervals for relatively low, even ambient temperatures.

It is provided to apply the procedure—for appropriate temperature intervals—also for these low temperatures. Ordinary liquids and vapors such as water, and some other liquids and vapors used in steam engines, can be used for heating and cooling the laminations, at temperatures sufficiently low to prevent any chemical action and oxidation of iron and nickel alloys. Even ordinary gases and air or products of combustion with the air can be used if the laminae are protected against oxidation by thin protecting layers and other means.

The procedure may also be used to transform into electricity and mechanical energy the heat of natural heat sources of relatively low temperature, such as hot underground waters and gases, or heat of steam condensers in steam engines, or residual heat of heating installations, motors, etc.; this heat being used in these cases to heat the fluid circulating in the thermomagnetic generators.

In special cases when the fluids of these heating sources have a sufficiently constant temperature they can be sent, alternately with an appropriate cooling fluid (in opposite directions) directly through the laminations, by means of suitable distributors, described in the above application, and by means of suitable forwarding devices or pressure, including vapor pressure. In this case the hot fluid, after passing through the interrupter section is not recirculated through a heater but is discharged, a continuous supply of hot fluid being fed with desired frequency and under certain pressure to the section through a suitable valve. (A heater may still be used, if necessary, to maintain the fluid accurately at the temperature required.) The circulation and evacuation of the cold fluid may be modified correspondingly. The hot fluid can also consist in air heated by partial combustion to a temperature sufficiently low to avoid any oxidation of the laminae.

In these cases of low temperature, when metallic liquid is used, it will be preferable to use the alloy of sodium and potassium which is liquid at a low temperature. Nickel alloys and particularly nickel-silicon alloys may be used for the laminations.

Practical embodiments of the invention are shown in the accompanying drawings, in which:

Fig. 1 represents a section, parallel to the direction of fluid flow, through an interrupter section, showing a composite lamina in plan or elevation (taken, for instance, on the line I—I of Fig. 11, looking in the direction of the arrows);

Fig. 2 represents a detail section, taken on the line II—II of Fig. 1 and perpendicular to the plane of said figure;

Fig. 3 represents a section, perpendicular to the direction of fluid flow, through a modified form of interrupter section;

Fig. 4 represents a section, parallel to the direction of fluid flow taken on the line IV—IV of Fig. 3;

Fig. 5 represents a detail plan view of a lamina such as shown in Fig. 3, having different shaped perforations;

Fig. 6 represents a section through an interrupter section in which the fluid flows in the direction of the magnetic flux;

Fig. 7 represents a section through an interrupter section in which the heating and cooling fluids are kept in separate channels;

Fig. 8 represents diagrammatically a system for automatic correction of temperature deviations in the heating and cooling fluids;

Fig. 9 represents a detail modification of the system shown in Fig. 8;

Figure 10:
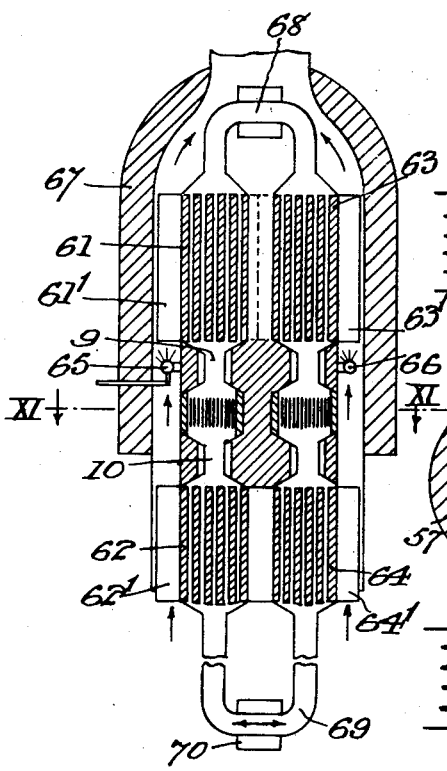
Fig. 10 represents diagrammatically, in vertical section, one form of generator in which the composite laminations may be used.
Figure 11:
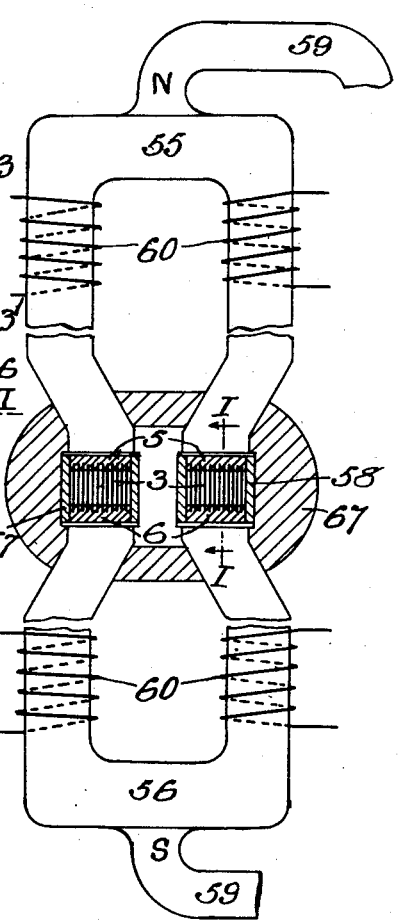
Fig. 11 represents a horizontal section taken on the line XI—XI of Fig. 10.

Referring to Fig. 1, a ferromagnetic armature in a generator or motor, for instance, of the types shown in my above mentioned application Serial No. 627,832 and in Figs. 10 and 11 herein is represented by the broken ends 1, 2 between which is a gap occupied by the interrupter section. This section includes a plurality of composite laminae 3, 3 each composed of narrow bands or elements $4^1, 4^2 \ldots 4^n$ of ferromagnetic material, mounted at their ends in walls or plates 5, 6 of magnetic material which lie close to the armature ends 1, 2. The elements constituting the composite laminae may be soldered together edgewise, as indicated at 7, 7 in Fig. 2, or may be simply juxtaposed (to avoid mixing of the constituents at high temperatures), and the laminae are disposed in parallel relationship to form channels 8, 8 for the passage of heating and cooling fluids. Such fluids are supplied through the conduits 9, 10 which are connected respectively to suitable heating and cooling devices and to means for oscillating the fluid column, as shown in Figs. 10 and 11 and more fully disclosed in the copending application referred to above.

The several bands or elements $4^1 \ldots 4^n$ are of metals or alloys having different Curie points, the element $4^1$ having the highest Curie point and said points decreasing in regular order to the lowest Curie point in the last element $4^n$. For purposes of illustration only fifteen elements are shown which, assuming the variation of Curie points between adjacent elements to be of the order of the Curie intervals of 2°–3°, would provide a range of 30° to 45° in Curie point temperature. Much greater ranges may be achieved by increasing the number of elements, for instance, to several hundred, the dimensions of the elements being reduced so that they will be very narrow bands or wires.

In the important modification shown in Figs. 3 and 4 the elements are formed as homogeneous perforated plates $11^1, 11^2 \ldots 11^n$ which are assembled in a pile or pack (Fig. 4) with their perforations 12, 12 alined to constitute channels through which heating and cooling fluids may be passed, in heat-exchange relation with all the elements in the pack. The elements are composed of materials having different Curie points, the element $11^1$ having the highest Curie point and said points decreasing in regular order to the lowest Curie point in the last element $11^n$. The elements are enclosed within a chamber having thin non-magnetic walls 13 and placed in the gap between ends 14, 15 of an armature. The armature ends are preferably laminated, as shown in Fig. 4, the laminations being separated by heat-insulating material 16, and the several elements $11^1 \ldots 11^n$ may also be separated by thin layers of heat insulation, or by slight spaces, to reduce heat losses. The heating and cooling fluids are supplied through the conduits 17, 18, corresponding to the conduits 9, 10 of Fig. 1.

While forty-three elements are shown in Fig. 4, it will be appreciated that the range of Curie point temperatures (85° to 125°, depending on the respective Curie intervals) thus provided for is not intended to represent the only suitable arrangement, but that the use of several hundred thinner elements will provide a much greater range. Thicknesses of .1 mm. to 1.0 mm. would be suitable.

Thus, the element $11^1$ may be nearly pure cobalt while the elements $11^2$ et seq. are cobalt with increasing proportions of nickel until pure nickel is reached, giving a total range of Curie points from about 1100° C. to 362° C. This range can be extended down to 10° C. by the provision of nickel-aluminum alloy elements with proportions of aluminum increasing from 0% to 6% as the element $11^n$ is approached. Further extensions can be made as previously explained by alloying the nickel with materials such as chromium, manganese or silicon. The iron-carbon range is much shorter but may be useful in some cases, either alone or substituted for cobalt-nickel in the part of the range having corresponding Curie points.

Since the ends 14, 15 of the armature may be heated almost to the temperature of the adjacent elements, care must be taken that these ends maintain their magnetic qualities; thus if the armature is of soft iron and elements having Curie points higher than 785° C. are used, the ends $14^1, 15^1$ of the armature should be of cobalt or an alloy thereof having a Curie point higher than the highest temperature to which it may be heated.

The perforations forming channels for the fluid may be circular as in Fig. 3, or other shapes such as the elongated slots 19 shown in Fig. 5. The perforations or slots may be distorted as desired in order to increase the heat transmission areas between the elements and the fluid.

In Fig. 6 a pile or pack of perforated elements $20^1 \ldots 20^n$ (similar to the elements $11^1 \ldots 11^n$) are placed in the gap between armature ends 21, 22 so as to lie at right angles to the direction of magnetic flux, the heating and cooling fluids passing from the conduits 23, 24, respectively to channels 25. The fluids are distributed through a multiplicity of narrow slots 26 in the headers 27 which provide satisfactory magnetic continuity between the ends 21, 22 and the elements $20^1 \ldots 20^n$, while the arrangement of the latter eliminates transverse heat losses.

If desired, the heating and cooling fluids may be kept in separate channels, as indicated in Fig. 7. An assembly of composite laminae 28 (of the type shown in Figs. 1 and 2) is connected to a manifold system with alternate passages between the laminae communicating with the inlet 29 and outlet 30 for the heating fluid, and the intervening channels communicating with the inlet 31 and outlet 32 for the cooling fluid. Alternating changes of temperature of the composite laminae, to and below the Curie point temperatures of the several elements, are affected by varying with the desired frequency the relative rate of flow of the fluids. In this case the heating and cooling fluids may be different, either chemically or physically, and the flow may be either in a single direction or oscillating.

It is important, for proper operation, to maintain constantly and automatically the alternating variation of the temperature of consecutive cross-sections of the "composite section" within limits approximately of the respective Curie intervals, so that each element has a periodical temperature variation in the limit of its Curie interval and consequently has a strong periodical variation of its magnetic properties. This may be effected, at first, by automatically maintaining the hot and cold liquids at definite temperatures by means, for instance, of pyrometric elements, controlling the delivery of heat by the hot source and its removal by the cold source. But because of the thermal inertia, such stabilization will not be instantaneous and admits fluctuations.

Accordingly to this "thermostatic" stabilization it is desirable to add another stabilization, based on a differential variation of the current produced by the generator itself as a function of the deviation of its temperatures from the optimum temperatures of operation. This differential current, acting on an electrodynamic system, not having any thermal inertia, will send through the composite section an excess of the hot or of the cold liquid, according to the deviation taking place, and immediately will reestablish the optimum temperature in the section, accenting at the same time the thermostatic stabilization.

Such an arrangement is shown diagrammatically in Fig. 8, where the armature (at least on one side of the gap) is divided into the parts 33, 34 having windings 35, 36. The part 33, for instance, is opposite the end of the interrupter section 37 which has elements with higher Curie points, and the part 34 is opposite the end with lower Curie points. The windings 35, 36 are connected (through suitable rectifiers and relays, if necessary, not shown), to the coils 38, 39, acting on a differential electromagnetic plunger 40. The plunger is pivotally mounted on a lever 41 which is connected to a pair of bellows 42, 43 so that motion of the lever will simultaneously expand one bellows and contract the other. The bellows 42 communicates through the pipe 44 with the heating fluid system adjacent the heater 45, and the bellows 43 communicates similarly through pipe 46 with the cooling fluid system adjacent the cooling device 47; said bellows and pipes being filled with fluid, such as a metallic liquid. An extension of the lever 41 acts on a differential resistance 48, the current through this resistance controlling the heating and cooling of the fluids, as by superimposition on the ordinary thermostatic control.

In operation, the apparatus will be adjusted so that the differential current from windings 35, 36 is zero when the distribution and oscillation of temperature in the section 37 is correct. Any deviation from this optimum condition which favors either the warmer or cooler end will produce a differential current in the windings 35, 36, which will act on the coils 38, 39 and plunger 40, causing the bellows to force an excess of heating or cooling fluid through the heater 45 or cooler 47, thus immediately reestablishing the desired temperature condition in the section 37. This action is supplemented, less rapidly, by the action of the resistance 48.

Fig. 9 shows a modification of the system of Fig. 8, in which differential windings 49, 50 (corresponding to windings 35, 36) are connected to a reversible motor 51, which operates, through a magnetic clutch or coupling 52, a propeller 53 in a chamber 54 (replacing the bellows 42, 43). In this case the corrective action may be of longer duration, since it is not limited by the capacity of the bellows.

Figs. 10 and 11 show a complete generator, corresponding to Figs. 5 and 7 of application Ser. No. 627,832, of a type in which the composite laminations and composite sections described herein are adapted to be used. In this device a ferromagnetic armature is shown as having symmetrical U-shaped parts 55, 56, the ends of which are connected by interrupter sections 57, 58 made up, for instance, of composite laminations 3 mounted in the walls 5, 6. The sections have openings 9, 10 for the passage of heating and cooling fluids which may be parts of an oscillating column of fluid. The armature is shown as being polarized, for instance, by association with a powerful permanent magnet 59 and the several sides of the armature are provided with windings 60.

The fluid heating and cooling system includes a heater 61 and cooler 62 for fluid traversing the section 57 and a heater 63 and cooler 64 for liquid traversing the section 58, the heaters being provided with fins 61' and 63' for efficiently picking up heat from the burners 65, 66 and the coolers having fins 62' and 64' for facilitating the dispersion of heat. The hot parts of the system may be enclosed in an insulating jacket 67 to ensure accurate control of the working temperature and to avoid heat losses. The fluid circulation is continuous, the upper ends of the heaters being connected by a conduit 68 and the lower ends of the coolers being connected by a conduit 69. Means for oscillating the fluid column is indicated diagrammatically at 70, this means being preferably located in the cool part of the apparatus and being electromagnetically or mechanically operated.

In operation, the fluid column is oscillated by the means 70, drawing hot fluid down from one of the heaters and through its corresponding interrupter section 57 or 58, while cool fluid is simultaneously passed up from the opposite cooler through the other section, this action being reversed with the frequency of the oscillations. The temperature of the hot fluid should be maintained approximately at or above the Curie point of the material of element 4' (Fig. 1) and the temperature of the cool fluid should be slightly lower than the Curie point of the element $4^n$, the temperature gradient of the fluids passing through the sections 57, 58 being desirably such that each element 4 of the laminations is heated and cooled only between its Curie point and a point near the bottom of its Curie interval. When the magnetic permeability of the sections 57, 58 is interrupted by heating the elements thereof approximately to their respective Curie points the magnetic flux in the corresponding side of the armature is modulated abruptly and electric current is induced in the windings 60 thereof; the alternate heating and cooling of the sections thus producing alternating current in said windings with a frequency corresponding to the frequency of the temperature changes. This frequency may be constant or may be varied almost instantaneously by suitable control of the speed of oscillation of the fluids.

The modified interrupter section arrangements shown in Figs. 3, 4 and 5 can obviously be substituted for the sections 57 and 58; while the further modifications of Figs. 6 and 7 require only a rearrangement of the direction of flow of the fluids.

Reference herein to a "thermomagnetic generator" is intended to include a thermomagnetic transformer of heat (thermal energy) into electrical and mechanical energy, and particularly a generator and/or motor of the type described in my copending application Serial Number 627,832.

It will be understood that various changes may be made in the form, construction, arrangement and materials of the apparatus and in the steps of the method without departing from the spirit and scope of the invention, hence I do not intend to be limited to the embodiments shown and described, but what I claim is:

1. The method of producing electrical and mechanical energy from thermic energy by alternately heating and cooling, with a prescribed frequency, to the Curie point and below said point, a ferromagnetic interrupter section occupying a gap in a ferromagnetic armature, said section having elements with different Curie points arranged in regular order of Curie point temperatures, which includes, passing a heating fluid in heat-exchange relation to said elements and in the direction of decreasing Curie point temperatures, and passing a cooling fluid in heat-exchange relation to said elements and in the direction of increasing Curie point temperatures.

2. The method according to claim 1 in which the heat remaining in the heating fluid after passing an element of higher Curie point and heating said element to its Curie point temperature, is used to heat the next succeeding element of lower Curie point to the Curie point temperature of said next element.

3. The method according to claim 1 in which sufficient heat is supplied to the heating fluid to maintain the part of said fluid adjacent the element of highest Curie point at a temperature no less than said point, and in which sufficient heat is removed from the cooling fluid to maintain the part of said fluid adjacent the element of lowest Curie point at a temperature no greater than said point.

4. The method according to claim 1 in which the heating and cooling fluids are liquid.

5. The method according to claim 1 in which the heating and cooling fluids are metallic liquids.

6. The method according to claim 1 in which the heating and cooling fluids are non-metallic liquids.

7. The method according to claim 1 in which the heating and cooling fluids are gaseous.

8. The method according to claim 1 which includes causing a preheated fluid to traverse the interrupter section directly from its source and thereafter discharging said fluid from the system.

9. In a thermomagnetic generator having a ferromagnetic armature, an interrupter section occupying a gap in said armature and comprising a plurality of ferromagnetic elements with different Curie points arranged across the section in regular order of Curie point temperatures, and fluid means for alternately heating said elements in the neighborhood of their Curie point temperatures and cooling said elements below said temperatures.

10. A generator according to claim 9 in which the ferromagnetic elements are provided with channels for the passage of said fluid heating and cooling means, the relation between the total cross-sectional area of the elements and the total cross-sectional area of the channels, taken in planes perpendicular to the direction of flow of the fluid, being such that the mean temperatures of the several elements are maintained approximately in the Curie intervals thereof and the alternating temperature variations of said elements are proportional to the values of said respective Curie intervals.

11. A generator according to claim 9 in which the difference between Curie point temperatures of adjacent elements does not substantially exceed the Curie interval of said elements.

12. A generator according to claim 9 in which the ferromagnetic elements are so juxtaposed as to form composite laminae of continuously varied chemical composition and continuously varied Curie points across each lamina.

13. A generator according to claim 9 in which the ferromagnetic elements are so juxtaposed as to form composite laminae, and in which said laminae are spaced to provide channels for the passage of said fluid heating and cooling means.

14. A generator according to claim 9 in which the ferromagnetic elements are so juxtaposed as to form composite laminae, and in which said laminae are shaped to provide channels for the passage of said fluid heating and cooling means, the channels for the heating means being completely separated from the channels for the cooling means.

15. A generator according to claim 9 in which the ferromagnetic elements are so juxtaposed as to form composite laminae, and in which said laminae are spaced to provide channels for the passage of said fluid heating and cooling means, said channels extending in a direction perpendicular to the direction of magnetic flux across the gap.

16. A generator according to claim 9 in which the ferromagnetic elements are so juxtaposed as to form composite laminae, and in which said laminae are spaced to provide channels for the passage of said fluid heating and cooling means, the laminae having their elements with the highest Curie point adjacent to the armature end at one end of the gap and their elements with the lowest Curie point adjacent to the armature end at the opposite end of the gap, said channels extending in the direction of magnetic flux across the gap.

17. In a thermomagnetic generator having a ferromagnetic armature, an interrupter section occupying a gap in said armature and comprising a plurality of perforated laminar ferromagnetic elements with different Curie points, each said element being homogeneous, said elements being assembled in regular order of Curie point temperature with their respective perforations alined to constitute channels through said assembly of elements, and fluid means for alternately heating said elements to their Curie point temperatures and cooling said elements below said temperatures, the order of the elements being considered in the direction of flow of said fluid means.

18. A generator according to claim 17 in which the laminar elements are disposed perpendicularly to the direction of magnetic flux across the gap, and in which the channels extend in the direction of said flux.

19. A generator according to claim 17 in which the laminar elements are disposed parallel to the direction of magnetic flux across the gap, and in which the channels extend perpendicularly to the direction of said flux.

20. A generator according to claim 17 in which the laminar elements are separated by thin layers of thermic insulating material.

21. In a thermomagnetic generator having a ferromagnetic armature, an interrupter section occupying a gap in said armature and comprising a plurality of ferromagnetic elements with different Curie points arranged in numerical order of Curie point temperatures, said sections being of iron with a carbon content varying within the range from 0.01% to an amount which lowers the Curie point of iron to the desired temperature.

22. In a thermomagnetic generator having a ferromagnetic armature, an interrupter section occupying a gap in said armature and comprising a plurality of ferromagnetic elements with different Curie points arranged in numerical order of Curie point temperatures, said sections being of cobalt and/or nickel, the cobalt content varying within the range from 100% to 0% and the nickel content varying within the range from 0% to 100%.

23. In a thermomagnetic generator having a ferromagnetic armature, an interrupter section occupying a gap in said armature and comprising a plurality of ferromagnetic elements with different Curie points arranged in numerical order of Curie point temperatures, said sections being of nickel with a content of non-magnetic material varying in amount from 0% to an amount which lowers the Curie point of nickel to the desired temperature.

24. In a thermomagnetic generator having a ferromagnetic armature, an interrupter section occupying a gap in said armature and comprising a plurality of ferromagnetic elements with different Curie points arranged in regular order of Curie point temperatures, fluid means for alternately heating said elements to their Curie point temperatures and cooling said elements below said temperatures, the order of the elements being considered in the direction of flow of said fluid means, and automatic temperature control means including means responsive to momentary deviations from optimum temperature of the ferromagnetic elements for temporarily increasing the flow of the fluid means for heating or cooling said elements.

25. In a thermomagnetic generator having a ferromagnetic armature, an interrupter section occupying a gap in said armature and comprising a plurality of ferromagnetic elements with different Curie points arranged in regular order of Curie point temperatures, fluid means for alternately heating said elements to their Curie point temperatures and cooling said elements below said temperatures, the order of the elements being considered in the direction of flow of said fluid and automatic temperature control means including differential electric windings on two parts of the armature, one part being adjacent elements having higher Curie points and the other part being adjacent elements having lower Curie points, and means responsive to differential currents induced in said windings for temporarily increasing the flow of the fluid means for heating or cooling said elements.

26. A thermomagnetic generator including a laminated ferromagnetic armature having a gap and an interrupter section occupying said gap and comprising a plurality of ferromagnetic elements with different Curie points arranged in numerical order of Curie point temperatures considered perpendicular to the direction of the magnetic flux in the armature, the laminations of the armature being separated adjacent the gap by heat-insulating material.

27. In a thermomagnetic apparatus, a ferromagnetic body with a progressive variation of Curie point temperature from one point to another point.

28. A body according to claim 27 in which the progressive variation is continuous.

29. A body according to claim 27 in which the progressive variation is step-by-step.

30. A body according to claim 27 in which the body is in the form of a lamina and in which the progressive variation is continuous.

31. A body according to claim 27 in which the body is in the form of a lamina and in which the progressive variation is step-by-step.

32. In a thermomagnetic apparatus, a composite body comprising a plurality of juxtaposed ferromagnetic laminations each with a progressive variation of Curie point temperature from one point to another point.

33. In a thermomagnetic apparatus, a composite body comprising a plurality of homogeneous ferromagnetic laminations graded as to Curie point and stacked so the Curie point increases from one face of the stack to the other face.

34. In a thermomagnetic apparatus, a ferromagnetic body composed substantially of Ni-Co alloys, the ratio of Co to Ni increasing progressively from one point to another point, whereby there results a progressive increase of Curie point temperature between said points.

35. In a thermomagnetic apparatus, a ferromagnetic body composed substantially of alloys of Ni with one or more non-magnetic materials from the group consisting of Al, Cr, Mn and Si, the ratio of non-magnetic material to Ni increasing progressively from one point to another point, whereby there results a progressive decrease of Curie point temperature between said points.

CONSTANTIN CHILOWSKY.

REFERENCES CITED

The following references are of record in the file of this patent:

UNITED STATES PATENTS

| Number | Name | Date |
| --- | --- | --- |
| 380,100 | Edison | Mar. 27, 1888 |
| 476,983 | Edison | June 14, 1892 |
| 1,539,516 | Schmidt | May 26, 1925 |
| 1,556,183 | Viz | Oct. 6, 1925 |